United States Patent

[11] 3,600,836

| | | | |
|---|---|---|---|
| [72] | Inventor | Toshiaki Miyamae 292, Nishi-Iwata, Higashi-Osaka, Osaka-Fu, Osaka, Japan | |
| [21] | Appl. No. | 651,554 | |
| [22] | Filed | July 6, 1967 | |
| [45] | Patented | Aug. 24, 1971 | |

[54] ALARM SIGNAL USED IN A FISHING ROD
5 Claims, 7 Drawing Figs.

[52] U.S. Cl. .................................................. 43/17, 340/283
[51] Int. Cl. ............................................ A01k 93/00
[50] Field of Search ......................................... 340/283, 261; 43/17

[56] References Cited
UNITED STATES PATENTS

| | | | |
|---|---|---|---|
| 2,978,828 | 4/1961 | McQuiston et al. | 43/17 |
| 2,995,853 | 8/1961 | Ohliger | 43/17 |
| 3,024,561 | 3/1962 | Wyatt | 43/17 |
| 3,280,496 | 10/1966 | London | 43/17 |

Primary Examiner—John W. Caldwell
Assistant Examiner—Scott F. Partridge
Attorney—Ernest G. Montague ABSTRACT: An alarm signal used in a fishing rod comprising a line suspension lever adapted to turn around a shaft provided in a direction substantially perpendicular to the fishing rod. A movable and a fixed connector are provided which contact each other whenever the line suspension lever turns around causing the electric circuit to actuate the alarm, including a buzzer and a pilot lamp. An electric cell is provided which may be closed to produce the signal as soon as a fish is hooked.

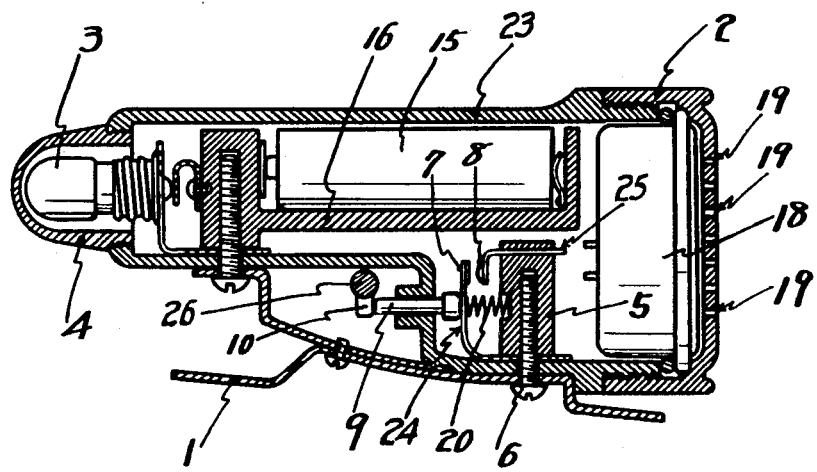
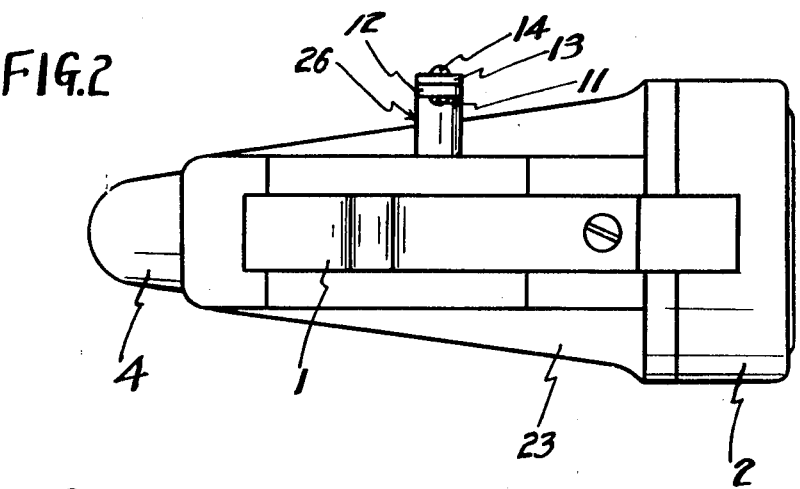
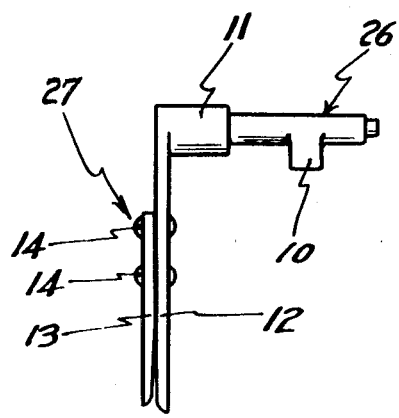

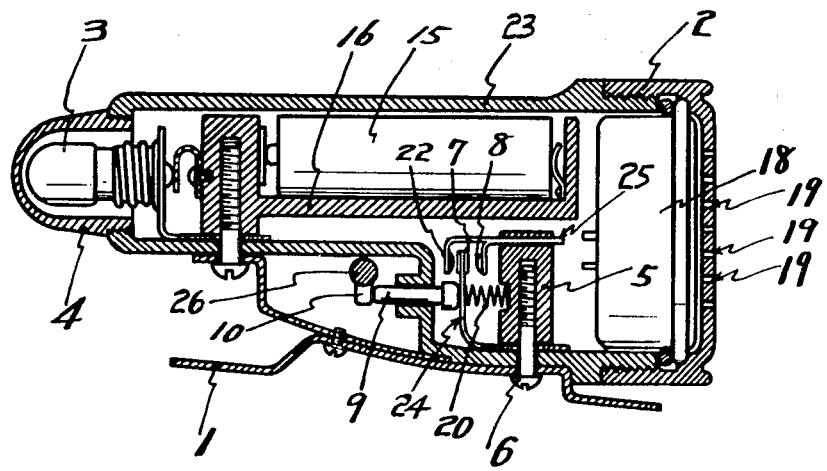
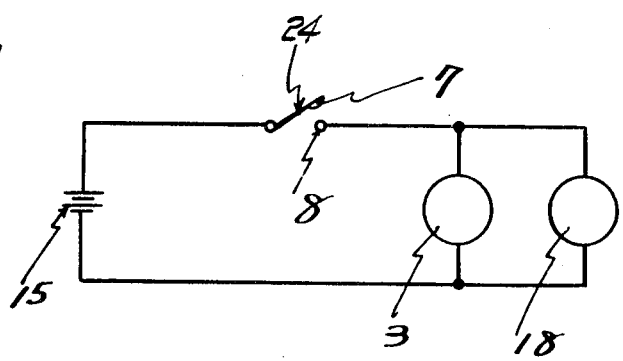
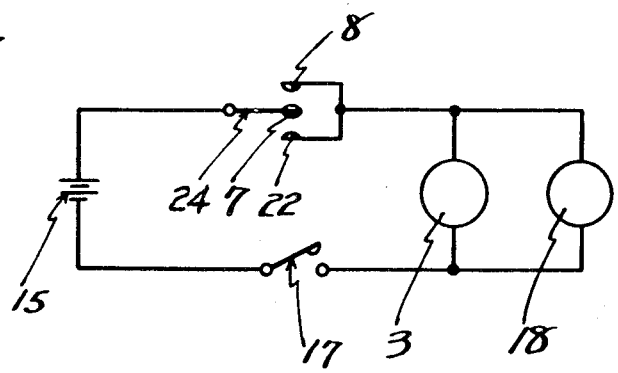

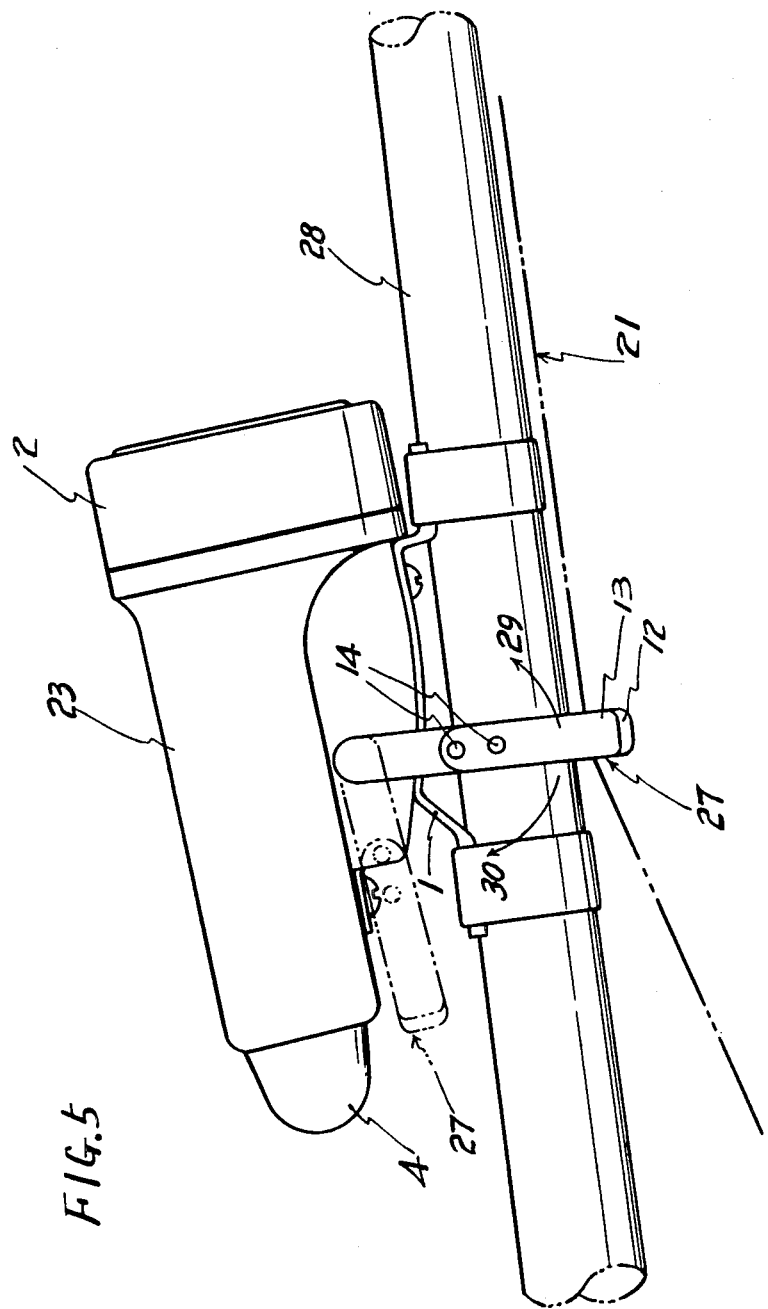

ALARM SIGNAL USED IN A FISHING ROD

The present invention relates to an alarm signal device for a fishing rod which provides an alarm when a fish is caught by a hook, in general, and to an alarm signal device for a fishing rod which electrically lights a pilot lamp and simultaneously buzzes an alarm whenever a fish is caught by the hook, the latter event causing on the fishing line either a sudden or slow tension or a slackening according to the movements of the hooked fish in various directions.

In the known art of alarm signal devices of this sort, bells are commonly used to give an alarm as soon as the fishing line is pulled by the fish, in the event of which, however, the alarm signal will be satisfactory provided only when the fishing line is given a sudden jerk by the fish. The bell will never ring if the line is not given a pull sufficient to ring the bell, such as, for instance, when the line is in a strained condition as a result of the sinker provided near the hook and the line is pulled gradually by the fish, or when the fish swims in a direction which tends to loosen the line. Yet it will freely ring when the wind blows hard causing the line to swing, which frequently happens.

It is an object of the present invention to provide an alarm signal device for fishing rods which avoids such defects of the conventional alarm signal devices.

With the above and other objects in view, which will become apparent in the following detailed description, the present invention will be clearly understood in connection with the accompanying drawings, of which:

FIG. 1 is a sectional side view of one embodiment of the present invention;

FIG. 2 is a plan view of the base;

FIG. 3 is an enlarged view of the axle provided with the line suspension lever;

FIG. 4 is a circuit diagram of the embodiment of FIG. 1;

FIG. 5 is a side elevational view of the alarm signal device according to the invention fixed on a fishing rod;

FIG. 6 is a sectional side view of another embodiment of the present invention; and FIG. 7 is a circuit diagram of the embodiment of FIG. 6.

Referring now to the drawings, and more particularly to FIGS. 1-5, an alarm signal device in accordance with the present invention comprises a case 23 fixed on a fishing rod 28 by a metal fixture 1 which is arranged in the lower part of the case. A cover 2 is fixed in front of the case 23, and a pilot lamp 3 is arranged in the rear part of the case 23, and is covered by a transparent member 4. A movable connector or contact member 24 and a fixed connector or contact member 25 are both fixed, through the intermediary of an insulator 5, to the inside of the case 23 by means of a screw 6. A connecting part 7 of the tip of the movable connector 25 stands opposite and spaced from a connecting part 8 of the tip of the fixed connector 25 by a small space therebetween. A shaft 9 is axially slidable and acts to press the movable connector 24 to contact the fixed connector 25. A lateral shaft 26 is arranged in a direction substantially at right angles to the fishing rod 28, when the case 23 is fitted upon the fishing rod 28. Upon one part of the shaft 26 is arranged a convex member 10 which serves to press the rear end of the axially slidable shaft 9, when the shaft 26 starts to turn. On the other hand, one end 11 of the shaft 26 (FIG. 2) projects out of the case 23 and a line suspension lever 27, which is made of synthetic resin or the like, is provided thereon. The lever 27 forms a projecting piece 12 which projects downwardly. Along one side of the projecting piece 12 is provided a small piece 13 which is separately formed, and the upper end part thereof is fixed by pins 14 to the piece 12, and the pieces 12 and 13 are formed tapering away from each in a direction away from the pins 14, so that the fishing line may be inserted between the projecting piece 12 and the small piece 13.

An electric cell 15 is inserted in its holder 16 and stored in the case 23, the rear part of which holds the pilot lamp 3. A buzzer 18 is provided in the front of the case 23 and, as shown in FIG. 4, both the pilot lamp 3 and the buzzer 18 are connected in parallel to the electric cell 15 through the movable connector 24 and the fixed connector 25, constituting a switch. A plurality of small openings 19 are formed in the cover 2 so as to increase the sound transmission of the buzzer 18 to outside the case. A spring 20 is provided between the movable connector 24 and the fixed connector 25, biasing the former out of contact with the latter. Whenever the fishing line is pulled by the fish with at least a certain amount of pull the movable connector 24 will overcome the force of the spring 20 and the alarms will be activated.

In operation, the metal fixture 1, provided in the lower part of the case 23, is fixed upon the fishing rod 28 so as to locate the alarm signal device in the slightly forward part of the gripping portion of the fishing rod 28. Accordingly, when the fishing line 21 is to be led from the fishing rod reel (not illustrated), provided near the gripping part of the rod, to the tip of the fishing rod, a part of the line 21 is held between the projecting piece 12 and the small piece 13 and passing on to the line suspension lever 27. In this condition, the forward part of the fishing line 21 hangs down into the water, so that the line may be held in a somewhat strained condition as a result of the sinker being arranged near the hook. Thus, whenever a hooked fish will pull the line 21, the line suspension lever 27 and the shaft 26 will turn in the direction of the arrow 29 in FIG. 5. As a result, the convex member of part 10 of the shaft 26 will push the rear end of the shaft or slidable axle 9, so that the axle 9 will slide to the right (FIG. 1) in opposition to the spring 20, causing the movable connector 24 to approach the fixed connector 25, so that the contacting part 7 of the former and the contacting part 8 of the latter will contact with each other to cause the buzzer to ring and to simultaneously light the pilot lamp 3. Since the unit is electrically operated, the signals will be provided with certainty whenever a sudden jerk is provided on the line or even if the line is pulled slowly by the fish. Further, the alarm signal can not accidentally occur as a result of blowing of the wind or the like.

In addition, since the pilot lamp 3 is lighted at the same time that the buzzer is sounded, one can easily identify which fishing rod first caught a fish, when several fishing rods are in use at the same time.

When the alarm signal is removed from the fishing rod 28, it can be easily carried, if the line suspension lever 27 is revolved around the shaft 26 in the direction shown by the arrow 30 in FIG. 5 and brought down as indicated by the two-point chain line in FIG. 5.

Referring now again to the drawings, and more particularly to FIGS. 6 and 7, another embodiment of the present invention is illustrated, wherein the tip of the fixed connector 25 is branched off into two pieces, as shown by FIG. 6, so as to provide a contacting part 22 located on the opposite side of the movable connector 24. If the fishing line 21 is passed onto the line suspension lever 27, previously described, and hangs down into the water, it will be strained by the sinker and the like so as to slightly compress the spring 20 and to hold the movable connector 24 nearly midway between the contacting part 8 of the fixed connector 25 and the other contacting part 22. The contacting part 7 of the movable connector 24 contacts the contacting part 22 of the fixed connector 25 due to the compression spring 20 when the fishing line 21 is removed from the line suspension lever 27. When the signal device is constructed as above mentioned, it will effectively operate even in the event that a fish swims in such a direction as to cause the line 21 to slacken as well as during the several other effective actions described in connection with the previous embodiment. That is, when the line 21 hangs down into the water, it will be strained to an extent due to the sinker being provided near the hook, and the movable connector 24 will be held almost midway between the contacting parts 8 and 22 of the fixed connector 25. If the hooked fish swims in a direction so as to slacken the line, the contacting part 7 of the movable connector 24 will be forced by the spring 20 to touch the contacting part 22 of the fixed connector 25 and thereby activate the alarm signals in a like manner as a sudden jerk given to the line as above-mentioned. In this instance, because of the electric circuit being closed when the movable connector 24 touches the contacting part 22 on account of the spring 20, when the fishing line is not passed onto the line suspension lever 27, an electric switch 17 is arranged in the circuit, for instance, as shown in FIG. 7.

In view of the above, several advantages of the present invention are now clear.

While I have disclosed two embodiments of the present invention, it is to be understood that these embodiments are given by example only and not in a limiting sense.

I claim:

1. An alarm signal used in a fishing rod comprising
a line,
a line suspension lever carrying said line and including a shaft pivotally mounted in a direction substantially at right angles with the fishing rod,
a movable contact means and a fixed contact means operatively disposed relative to each other,
said shaft is formed with a convex member projecting therefrom,
a slidable axle,
one end of said slidable axle abuts said movable contact means,
the other end of said slidable axle is operatively positioned adjacent said convex member,
a spring biasing said movable contact means against said one end of said slidable axle and in an inoperative position out of contact from said fixed contact means,
said movable contact means operatively disposed relative to said slidable axle and said fixed contact means being positioned to touch each other when said line suspension lever is pivoted,
a sound alarm and a pilot light alarm,
an electric circuit including an electric cell connecting said alarms and connected to said movable contact means and to said fixed contact means in order to give out signals from said alarms when a fish is hooked on said line thereby pivoting said line suspension lever.

2. The alarm, as set forth in claim 1, wherein
said line suspension lever is formed such that the line is detached from said line suspension lever when a fish pulls said line.

3. The alarm, as set forth in claim 2, wherein
said line suspension lever comprises,
a projecting piece mounted on said shaft,
a small piece secured to said projecting piece,
said pieces tapering away from each other in a direction towards their free ends forming an opening, and
said line being detachably inserted in said opening.

4. An alarm signal used in a fishing rod comprising
a line,
a line suspension lever carrying said line and including a shaft pivotally mounted in a direction substantially at right angles with the fishing rod,
a movable spring biased contact means operatively disposed movably by said line suspension lever and a fixed contact means disposed in the path of said movable contact means,
a sound alarm and a pilot light alarm,
an electric circuit including an electric cell connecting said alarms and connected to said movable contact means and to said fixed contact means,
said fixed contact means having two spaced contacting parts,
said movable contact means being movably positioned between said two spaced contacting parts so that said electric circuit connecting said alarms and said electric cell is closed to actuate said alarms whenever the fishing line carried by said line suspension lever is strained in any extent to cause said movable contact means to contact either of said two spaced contacting parts, and
said two spaced contacting parts being oriented operatively relative to the direction of said line and said line suspension lever such that a slackening of said line causes said movable contact means to make contact with one of said two spaced contacting parts and a sudden jerking of said line causes said movable contact means to make contact with the other of said two spaced contacting parts.

5. An alarm signal used in a fishing rod comprising
a line,
a line suspension lever carrying said line and including a shaft pivotally mounted in a direction substantially at right angles with the fishing rod,
a movable contact means operatively disposed relative to said line suspension lever and a fixed contact means being positioned to touch each other when said line suspension lever is pivoted,
a sound alarm and a pilot light alarm,
an electric circuit including an electric cell connecting said alarms and connected to said movable contact means and to said fixed contact means in order to give out signals from said alarms when a fish is hooked on said line thereby pivoting said line suspension lever,
said line suspension lever is formed such that the line is detached from said line suspension lever when a fish pulls said line,
said line suspension lever comprises,
a projecting piece mounted on said shaft,
a small piece secured to said projecting piece,
said pieces tapering away from each other in a direction towards their free ends forming an opening,
said line being detachably inserted in said opening,
said shaft is formed with a convex member projecting therefrom,
a slidable axle,
one end of said slidable axle abuts said movable contact means,
the other end of said slidable axle is operatively positioned adjacent said convex member, and
a spring biasing said movable contact means against said one end of said slidable axle and in an inoperative position out of contact from said fixed contact means.